(12) United States Patent
Gutscher et al.

(10) Patent No.: US 9,617,946 B2
(45) Date of Patent: Apr. 11, 2017

(54) METHOD FOR CONTROLLING AN INTERNAL COMBUSTION ENGINE, AND SYSTEM HAVING AN INTERNAL COMBUSTION ENGINE AND A CONTROL DEVICE

(71) Applicant: Robert Bosch GmbH, Stuttgart (DE)

(72) Inventors: Andreas Gutscher, Markgroeningen (DE); Andreas Posselt, Muehlacker (DE); Marko Lorenz, Grossbottwar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 185 days.

(21) Appl. No.: 14/410,687

(22) PCT Filed: May 14, 2013

(86) PCT No.: PCT/EP2013/059892
§ 371 (c)(1),
(2) Date: Dec. 23, 2014

(87) PCT Pub. No.: WO2014/000946
PCT Pub. Date: Jan. 3, 2014

(65) Prior Publication Data
US 2015/0192086 A1 Jul. 9, 2015

(30) Foreign Application Priority Data

Jun. 27, 2012 (DE) ........................ 10 2012 210 937

(51) Int. Cl.
*F02B 13/00* (2006.01)
*F02D 41/30* (2006.01)
(Continued)

(52) U.S. Cl.
CPC ..... *F02D 41/3094* (2013.01); *F02D 19/0692* (2013.01); *F02D 41/2432* (2013.01); *F02D 41/34* (2013.01); *Y02T 10/36* (2013.01)

(58) Field of Classification Search
CPC .............................. F02D 19/00; F02D 19/0613
(Continued)

(56) References Cited

U.S. PATENT DOCUMENTS 4,955,345 A * 9/1990 Brown ................ F02D 41/0025
123/381
5,159,914 A * 11/1992 Follmer .................. F02D 41/10
123/478

FOREIGN PATENT DOCUMENTS

DE   10 2008 044244   6/2010
DE   10 2009 031583   1/2011
(Continued)

OTHER PUBLICATIONS

International Search Report for PCT/EP2013/059892, dated Sep. 30, 2013.

*Primary Examiner* — John Kwon
(74) *Attorney, Agent, or Firm* — Gerard Messina

(57) ABSTRACT

In a method for controlling an internal combustion engine, during a standard operating mode a specified first fuel quantity is injected by actuating a first fuel injector during a first actuation period and by an accompanying opening of a first valve needle, and a specified second fuel quantity is injected by actuating a second fuel injector during a second actuation period and by an accompanying opening of a second valve needle, and (i) during a first calibration operating mode, a calibration actuation of the first fuel injector is performed while an actuation of the second fuel injector is carried out, or (ii) during a second calibration operating mode, a calibration actuation of the second fuel injector is (Continued)

carried out while an actuation of the first fuel injector is carried out.

15 Claims, 2 Drawing Sheets

(51) Int. Cl.
*F02D 41/24* (2006.01)
*F02D 19/06* (2006.01)
*F02D 41/34* (2006.01)

(58) Field of Classification Search
USPC ........ 701/101, 104, 114, 115; 123/434, 445, 123/478, 480, 525, 575, 578, 577, 576; 73/114.38, 114.45
See application file for complete search history.

(56) References Cited

FOREIGN PATENT DOCUMENTS

| | | |
|---|---|---|
| DE | 10 2010 003209 | 9/2011 |
| EP | 1 359 307 A2 | 11/2003 |
| EP | 2 163 750 | 3/2010 |
| JP | S6036739 A | 2/1985 |
| JP | H0436036 A | 2/1992 |
| JP | 2001-280189 A | 10/2001 |
| JP | 2002-004922 A | 1/2002 |
| JP | 2009-114884 A | 5/2009 |
| JP | 2010-223071 A | 10/2010 |

* cited by examiner

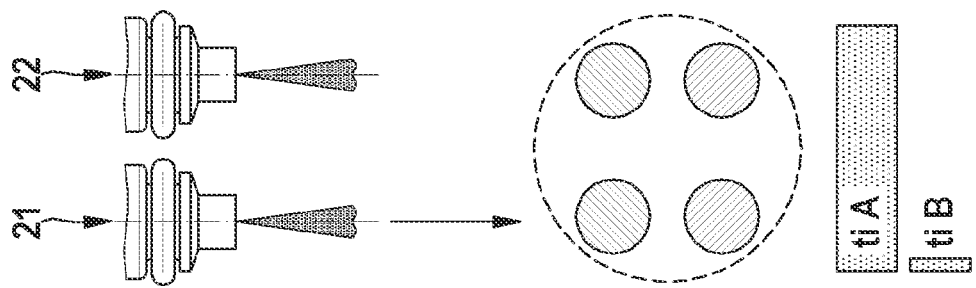
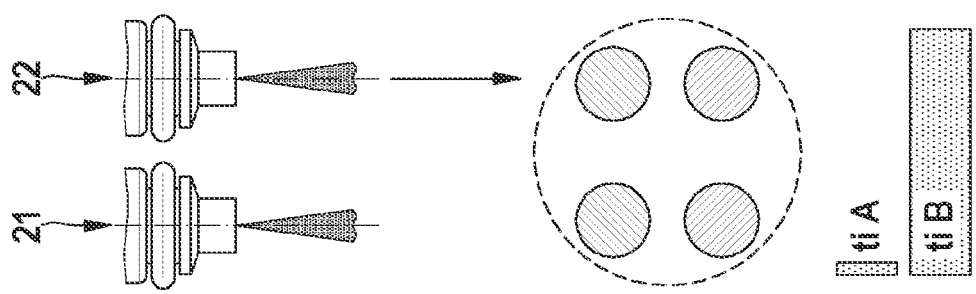
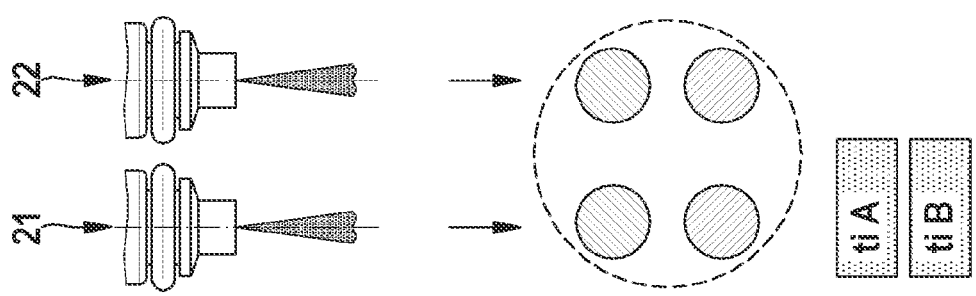

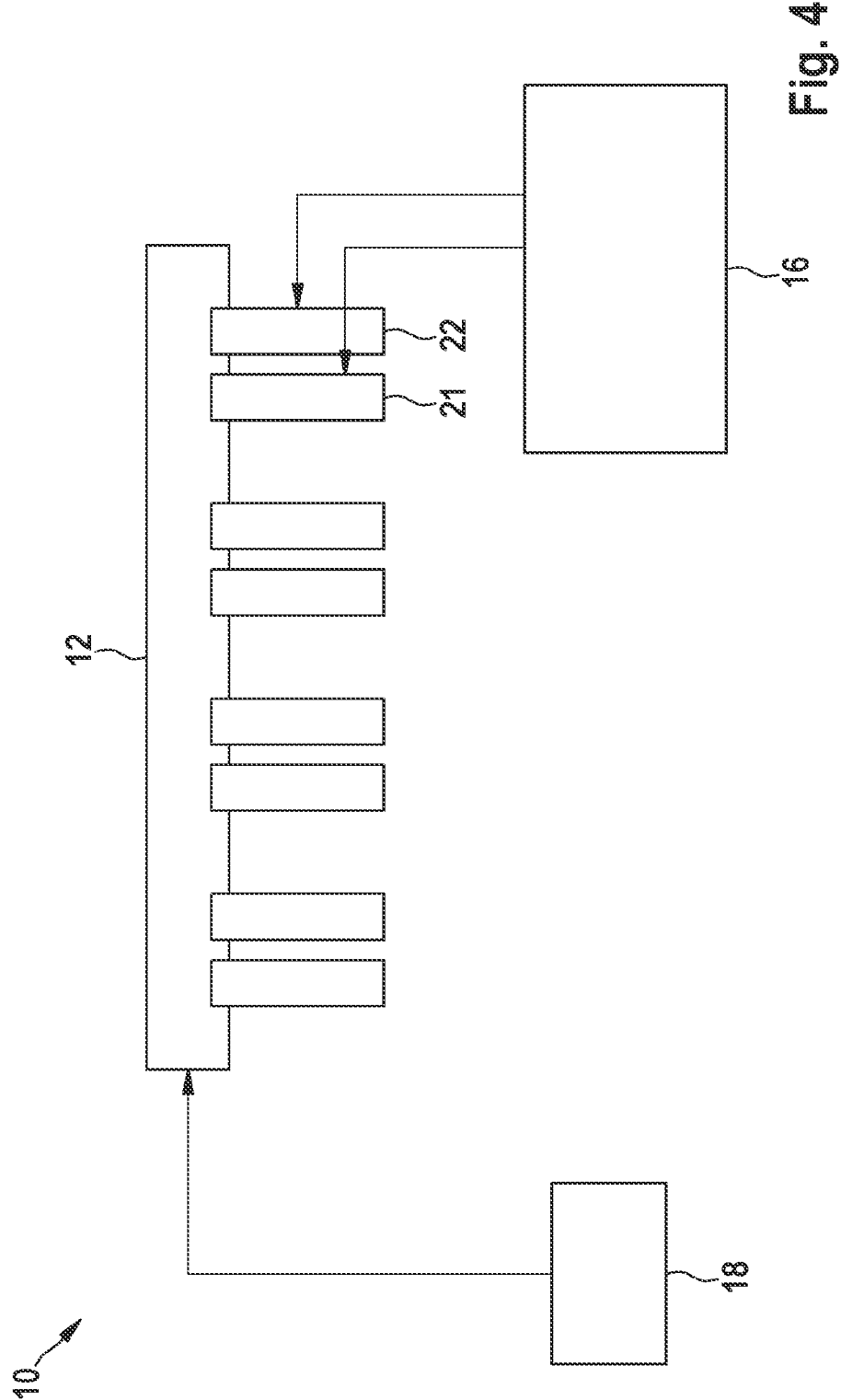

METHOD FOR CONTROLLING AN INTERNAL COMBUSTION ENGINE, AND SYSTEM HAVING AN INTERNAL COMBUSTION ENGINE AND A CONTROL DEVICE

BACKGROUND OF THE INVENTION

1. Field of the Invention

The present invention relates to a device, a computer program, and a method for controlling an internal combustion engine.

2. Description of the Related Art

Internal combustion engines featuring manifold injection using two fuel injectors per cylinder are generally known. For example, an internal combustion engine having at least one combustion chamber is known from the published German patent application document DE 10 2008 044 244 A1, the combustion chamber having two fuel inlet openings, which can each be closed by an inlet valve. Furthermore, the internal combustion engine has a fuel injection device, which, assigned to the at least one combustion chamber, has a first fuel injector and a separate second fuel injector for the metered injection of fuel into at least one induction port of the combustion chamber. For this purpose, the fuel injectors inject the atomized fuel in the form of spray cones in the direction of the inlet valves.

Furthermore, the so-called controlled operation of solenoid valves is known from the related art, in which, using suitable feedback variables (for example, current or voltage), the real movement of the valve needle and its stroke can be evaluated and are therefore detectable. This is also referred to as CVO (Controlled Valve Operation), so that, as a result, the movement of the valve needle (that is, the needle movement) or the needle stroke can be steadily adjusted from one stroke of a valve to the next or across multiple valves using suitable algorithms. It is also known in the related art to ascertain the so-called valve delay time using specific actuation strategies, for example, using multiple injections.

For ascertaining or adapting such controls or such an operating behavior, either specific operating points having short valve actuation periods have to be activated or the injection has to be divided into two injections separated in time—one short injection to learn the valve behavior and one longer injection to accommodate the required injection quantity. Here it is disadvantageous that ascertaining or adapting the actuation depends on a multitude of secondary conditions and, therefore, cannot necessarily occur at an optimal point in time or in a required measure or scope.

BRIEF SUMMARY OF THE INVENTION

The method according to the present invention for controlling an internal combustion engine, the system according to the present invention having an internal combustion engine and a control device, and the computer program according to the present invention or the computer program product have the advantage over the related art that ascertaining the optimal actuation of the respective fuel injector or adapting such an actuation may occur or be carried out both, in the first calibration operating mode (with regard to the first fuel injector), and in the second calibration operating mode (with regard to the second fuel injector); it being possible, in specific (part load) operating ranges of the internal combustion engine, to adapt the actuation of the respective fuel injector either completely without fulfilling further ancillary conditions or else at least by observing fewer boundary conditions or boundary conditions of a less limiting character. According to the present invention, adapting the actuation of the respective fuel injector is of particular interest especially in the small quantity range, in which a non-linear behavior of the fuel injector has to be assumed. Therefore, according to the present invention, it is advantageously possible to ascertain the needle stroke behavior in a particularly simple, precise and fast manner for a, compared to the related art, wide or wider range of possible situations, in particular with regard to specifying the valve delay time. According to the present invention, one of the two fuel injectors provided for one cylinder (that is, the second fuel injector in the first calibration operating mode, and the first fuel injector in the second calibration operating mode) covers the full injection quantity (that is, the specified target fuel quantity) of fuel for securing a failure-free combustion process, while the other fuel injector (the first fuel injector in the first calibration operating mode, and the second fuel injector in the second calibration operating mode) is calibrated in that it is activated using the smallest actuation durations (which are slowly increasing, i.e. from one injection interval to the next injection interval). According to the present invention, this advantageously results in separating the function of the fuel injectors for maintaining the engine operation on the one hand and the function of adapting the valve behavior, in particular to determine the valve delay, on the other hand. According to the present invention, this advantageously makes it possible to assess and adapt the small quantity behavior in the different operating points, in particular also in dynamic operation. In this case, the adaptation in particular is not dependent on certain operating points (such as a steady-state operation) for its execution. According to the present invention, it is further advantageous that the exhaust gas or exhaust gases has/have no influence or at least a lesser influence when carrying out the adaptation, in particular vis-a-vis the use of a split injection (i.e. an injection sequentially separated in time into an adaptation phase and an operational phase), using only one injector. It is further advantageous that, according to the present invention, assessing and adapting the valve behavior is possible using short actuation periods of the fuel injector exclusively (instead of having to use both shorter and longer actuation periods in an alternating manner in the dual injection), so that the actual small quantity operation of the fuel injector is able to be monitored and adapted according to the present invention. For this reason, it is also advantageous according to the present invention that the adaptation may be carried out more often (in specific operating ranges even continuously), so that a possible temporal drift in the behavior of the fuel injector or the valve needle of the fuel injector may be detected at an early stage and be regulated consistently.

The internal combustion engine used for the method according to the present invention is in particular an Otto engine featuring manifold injection for a motor vehicle, preferably an automobile. For this purpose, the fuel used may be gasoline or also ethanol or mixed fuel. The internal combustion engine has preferably more than one cylinder, each cylinder having one combustion chamber, including, for example, two inlet valves, and respectively one separate fuel injector or also two separate fuel injectors preferably being assigned to each inlet valve.

According to the present invention, it is particularly preferable that the specified target fuel quantity in the calibration operating mode corresponds to the sum of the first and second fuel quantity in the standard operating mode. The first or the second calibration operating mode is thereby able to replace the standard operating mode. Furthermore, it is also advantageous according to the present invention that the calibration actuation of the first fuel injector in the first calibration operating mode or of the second fuel injector in the second calibration operating mode occurs in such a way that during consecutive operating cycles the calibration actuation occurs on the basis of such short actuation periods that at first an opening movement of the first or second valve needle does not occur. In this manner, the valve delay time is able to be specified in a particularly exact way.

According to the present invention, it is advantageously possible to inject with great precision varying fuel injection quantities across a broad range using the first and second fuel injector. According to the present invention, when configuring the first and second fuel injector with regard to the maximally injectable fuel quantity (so-called quantity $Q_{stat}$) (under specified operating conditions), the fuel injectors may be designed for quantities of equal or also different size. Designing the fuel injectors in a uniform manner (where the configured fuel quantity of a fuel injector is cut in half (with respect to the total fuel quantity to be injected)) has the advantage of allowing for a larger production quantity of fuel injectors with the correspondingly achievable cost advantages.

Another subject matter of the present invention is a system having an internal combustion engine and a control device to control the internal combustion engine.

Exemplary embodiments of the present invention are shown in the drawing and explained in greater detail in the following description.

BRIEF DESCRIPTION OF THE DRAWINGS

FIGS. 1 through 3 show schematic representations of different apportionments of a fuel quantity to be injected to two fuel injectors.

FIG. 4 shows a schematic representation of a fuel injection system.

DETAILED DESCRIPTION OF THE INVENTION

In the different figures, identical parts are always provided with the identical reference characters and are therefore generally also labeled or referenced only once.

FIG. 1 schematically illustrates the apportionment of a total injection quantity for a cylinder of an internal combustion engine to two fuel injectors (that is, first fuel injector 21 and second fuel injector 22). In the case of two fuel injectors, a total quantity $Q_{stat}$ of fuel to be injected is achieved in that, for example, each of the fuel injectors injects respectively 50% of the maximum injection quantity $Q_{stat}$ which, for example, may be achieved using only one injection jet. The representation according to FIG. 1 corresponds to an exemplary illustration of the standard operating mode of the internal combustion engine. In the lower part of FIG. 1, the injection durations for the two fuel injectors 21, 22 is schematically indicated by the label "ti A" and "ti B" and two horizontally oriented bars. Horizontal bars of equal length for both fuel injectors (that is, for first fuel injector 21 or fuel injector A and for second fuel injector 22 or fuel injector B) mean that both fuel injectors are actuated (for opening the valve needle) for the same period of time.

In FIG. 2 and FIG. 3, the apportionment of a total injection quantity for one cylinder of an internal combustion engine to two fuel injectors is schematically represented in such a way that the required total fuel quantity is injected using only one fuel injector and the other fuel injector is calibrated. The representation according to FIGS. 2 and 3 corresponds to an exemplary illustration of the first calibration operating mode (FIG. 2) or the second calibration operating mode (FIG. 3) of the internal combustion engine. In the lower part of FIG. 2, the injection durations for the two fuel injectors 21, 22 is schematically indicated by the label "ti A" and label "ti B" and two horizontally oriented bars, i.e. the (shorter) actuation period ("ti A") of first fuel injector 21 in the first calibration operating mode is very short, so that, if applicable, no movement of the valve needle and, therefore, no opening of the fuel injector occurs, while the (longer) actuation period ("ti B") of second fuel injector 22 in the first calibration operating mode is dimensioned in such a way that the injected fuel quantity corresponds with the required fuel quantity in the respective operating point. In the lower part of FIG. 3, the injection durations for the two fuel injectors 21, 22 is schematically indicated by the label "ti A" and label "ti B" and two horizontally oriented bars, i.e. the (shorter) actuation period ("ti B") of second fuel injector 22 in the second calibration operating mode is very short, so that, if applicable, no movement of the valve needle and, therefore, no opening of the fuel injector occurs, while the (longer) actuation period ("ti A") of first fuel injector 21 in the second calibration operating mode is dimensioned in such a way that the injected fuel quantity corresponds with the required fuel quantity in the respective operating point.

Fuel supply system 10 of an internal combustion engine, provided for use in a vehicle, is schematically represented in FIG. 4. The internal combustion engine typically has four cylinders and, therefore, four combustion chambers, but a different number of cylinders and, therefore, combustion chambers is also possible. The internal combustion engine is a specific embodiment, in which the fuel, preferably Otto fuel, is not directly injected into the combustion chambers, but using a manifold injection. According to the present invention, it is in principle also possible to inject the fuel directly into the combustion chambers.

Using a pump (not shown), the fuel is pumped from tank 18, in particular via a filter (not shown), into a pressure chamber or pressure accumulator 12.

Fuel injectors provided for injecting fuel into the combustion chambers or the induction pipes of the combustion chambers are connected to pressure accumulator 12. For this purpose, the case of four cylinders and two fuel injectors per cylinder is schematically illustrated in FIG. 2, each cylinder having one fuel injector 21 and an additional fuel injector 22. According to the present invention, however, a different constellation—regarding the number of cylinders on the one hand, and regarding the number of fuel injectors per cylinder on the other hand—is also possible, such as one fuel injector per cylinder or more than two fuel injectors per cylinder. In particular, two manifold injectors are provided for each induction port in the present invention, so that fuel is injected via two paths into one induction pipe (a so-called twin injection). According to the present invention, these two fuel injectors are actuated via two separate electronic output stages, so that the two fuel injectors are actuated either synchronously or individually, i.e. different phases and/or different time durations are used. According to the present invention, the fuel injectors are actuated by control device 16 or control unit 16.

In a specific operating point, the internal combustion engine or combustion engine requires a specific fuel quantity per cylinder, which, depending on the system configuration, corresponds to a specific injection time "ti" at the respective fuel injector. In the twin injection according to the present invention (that is, using at least one first fuel injector 21 and one second fuel injector 22 per cylinder or per combustion chamber), the required fuel quantity for each combustion chamber is supplied via two fuel injectors, in particular in the induction port. During standard operation, i.e. in a standard operating mode, both twin injectors, that is, fuel injectors 21 and 22, assume the task of metering out fuel, which is illustrated in FIG. 1. During an adaptation operation, the function of both fuel injectors is separated, which is illustrated in FIG. 2 and FIG. 3. For both, the first calibration operating mode illustrated in FIG. 2 and the second calibration operating mode illustrated in FIG. 3, one of the two fuel injectors (second fuel injector 22 in the first calibration operating mode and first fuel injector 21 in the first calibration operating mode) is operated to cover the injection quantity required in this operating point. The additional fuel injector (the first fuel injector in the first calibration operating mode and the second fuel injector in the second calibration operating mode) is activated using a very short actuation period. In doing so, the needle of the fuel injector activated by a short actuation period will not yet lift off from the valve seat. The actuation period is now slowly prolonged until the needle finally lifts off and at first, even before reaching the upper stop, changes direction and drops back onto the valve seat. An actuation duration during which the valve needle also reaches the upper stop is eventually reached and exceeded. In the present invention, the behavior of the valve needle is detected in particular by evaluating the behavior of current signals and/or voltage signals, especially by monitoring a negative voltage resulting from the closing movement of the valve needle due to the inductive effect in the magnetic circuit of the fuel injector.

After completing the adaptation of one injector, the adaptation of the other injector is able to be started with reversed roles, i.e. the first calibration operating mode and the second calibration operating mode correspond with each other, the roles being merely reversed (in particular when the first and the second fuel injector are configured in the same manner (same $Q_{stat}$)).

Of particular interest is the behavior of very short actuation periods. Here, the discharged fuel quantity of the injector to be adapted (i.e. the first fuel injector in the first calibration operating mode or the second fuel injector in the second calibration operating mode) is zero or very small compared to the quantity of the other injector that contributes the fuel quantity required for the operating point. Therefore, the influence on the fuel/air ratio of the combustion chamber (that is, the so-called lambda value of the combustion chamber) and, therefore, the impact on irregular running or exhaust gas is negligible.

Since one injector covers the total injection quantity during the adaptation phase, an adaptation may also occur in dynamic operations, because this influences only the injector covering the injection quantity, but not the injector to be adapted. Therefore, the implementation of the adaptation is independent of the operating range and the operating state of the engine, which means increased robustness and greater freedom for carrying out the adaptation.

Besides its use in a so-called twin injection, the present invention may be transferred also to systems using manifold injection and gasoline direct injection, so-called PDI systems, in which the other injector may be adapted also in operating points, in which one of the two injectors is in a position to cover the total quantity.

The same applies to the usage of so-called bi-fuel systems, in which the different fuel types are injected by different fuel injectors.

What is claimed is:

1. A method for controlling an internal combustion engine having at least one cylinder and at least a first fuel injector and a second fuel injector per cylinder, the first fuel injector having a first valve needle and a first valve having a first valve seat, and the second fuel injector having a second valve needle and a second valve having a second valve seat, the method comprising:
performing the following in a standard operating mode of the internal combustion engine:
injecting a specified first fuel quantity by actuating the first fuel injector during a first actuation period and by an accompanying opening movement of the first valve needle; and
injecting a specified second fuel quantity by actuating the second fuel injector during a second actuation period and by an accompanying opening movement of the second valve needle; and performing one of the following:
(i) in a first calibration operating mode of the internal combustion engine:
performing a calibration actuation of the first fuel injector, while at the same time actuating the second fuel injector to inject a specified target fuel quantity, wherein the calibration actuation of the first fuel injector actuates the first fuel injector to move the first valve needle in an opening move whereby the first valve needle moves off the first valve seat, and then to move the first valve needle in a closing move whereby the first valve needle drops down to the first valve seat, and
monitoring the first valve needle during at least one of the opening and closing move of the first valve needle; or
(ii) in a second calibration operating mode of the internal combustion engine:
performing a calibration actuation of the second fuel injector, while at the same time actuating the first fuel injector to inject the specified target fuel quantity, wherein the calibration actuation of the second fuel injector actuates the second fuel injector to move the second valve needle in an opening move whereby the second valve needle moves off the second valve seat, and then to move performs a closing move whereby the second valve needle drops down to the second valve seat, and
monitoring the second valve needle during at least one of the opening and closing move of the second valve needle.

2. The method as recited in claim 1, wherein the specified target fuel quantity in each of the first and second calibration operating modes corresponds to the sum of the first and second fuel quantities in the standard operating mode.

3. The method as recited in claim 2, wherein one of the calibration actuation of the first fuel injector in the first calibration operating mode or the calibration actuation of the second fuel injector in the second calibration operating mode occurs in such a way that, during consecutive operating cycles, the calibration actuation occurs in short actuation periods such that, at first, an opening movement of one of the first or second valve needle does not occur.

4. The method as recited in claim 2, wherein the internal combustion engine is controlled by a control device, and, for the purpose of injecting fuel, the first fuel injector is actuated via a first output stage and a second fuel injector is actuated independently of the first fuel injector via a second output stage.

5. The method as recited in claim 2, wherein at least one of the first fuel injector and the second fuel injector is provided for a manifold injection.

6. A system comprising:
an internal combustion engine; and
a control device for controlling the internal combustion engine;
wherein the internal combustion engine has at least one cylinder and, for the purpose of injecting fuel, the internal combustion engine has at least a first fuel injector and a second fuel injector per cylinder, the first fuel injector having a first valve needle and a first valve having a first valve seat, and the second fuel injector having a second valve needle and a second valve having a second valve seat; and
wherein the internal combustion engine is configured for:
operating in a standard operating mode, the internal combustion engine being configured to inject a specified first fuel quantity by actuating the first fuel injector during a first actuation period and an accompanying opening movement of the first valve needle and to inject a specified second fuel quantity by actuating a second fuel injector during a second actuation period and an accompanying opening movement of the second valve needle; and
one of:
(i) operating in a first calibration operating mode, the internal combustion engine being configured to carry out a calibration actuation of the first fuel injector, while at the same time actuate of the second fuel injector to inject a specified target fuel quantity, wherein the calibration actuation of the first fuel injector actuates the first fuel injector to move the first valve needle in an opening move whereby the first valve needle moves off the first valve seat, and then to move the first valve needle in a closing move whereby the first valve needle drops down to the first valve seat, the control device monitoring the first valve needle during at least one of the opening and closing move of the first valve needle; or
(ii) operating in a second calibration operating mode, the internal combustion engine being configured to carry out a calibration actuation of the second fuel injector, while at the same time actuate the first fuel injector to inject the specified target fuel quantity, wherein the calibration actuation of the second fuel injector actuates the second fuel injector to move the second valve needle in an opening move whereby the second valve needle moves off the second valve seat, and to move the second valve needle in a closing move whereby the second valve needle drops down to the second valve seat, the control device monitoring the second valve needle during at least one of the opening and closing move of the second valve needle.

7. A non-transitory, computer-readable data storage medium storing a computer program having program code which, when executed on a computer, performs a method for controlling an internal combustion engine having at least one cylinder and at least a first fuel injector and a second fuel injector per cylinder, the first fuel injector having a first valve needle and a first valve having a first valve seat, and the second fuel injector having a second valve needle and a second valve having a second valve seat, the method comprising:

performing the following in a standard operating mode of the internal combustion engine:
injecting a specified first fuel quantity by actuating the first fuel injector during a first actuation period and by an accompanying opening movement of the first valve needle; and
injecting a specified second fuel quantity by actuating the second fuel injector during a second actuation period and by an accompanying opening movement of the second valve needle; and
performing one of the following:
(i) in a first calibration operating mode of the internal combustion engine:
performing a calibration actuation of the first fuel injector, while at the same time actuating the second fuel injector to inject a specified target fuel quantity, wherein the calibration actuation of the first fuel injector actuates the first fuel injector to move the first valve needle in an opening move whereby the first valve needle moves off the first valve seat, and then to move the first valve needle in a closing move whereby the first valve needle drops down to the first valve seat, and
monitoring the first valve needle during at least one of the opening and closing move of the first valve needle; or
(ii) in a second calibration operating mode of the internal combustion engine:
performing a calibration actuation of the second fuel injector, while at the same time actuating the first fuel injector to inject the specified target fuel quantity, wherein the calibration actuation of the second fuel injector actuates the second fuel injector to move the second valve needle in an opening move whereby the second valve needle moves off the second valve seat, and then to move the second valve needle in a closing move whereby the second valve needle drops down to the second valve seat, and
monitoring the second valve needle during at least one of the opening and closing move of the second valve needle.

8. The method as recited in claim 1, wherein the monitoring of the valve needle of the first fuel injector and the monitoring of the valve needle of the second fuel injector includes monitoring a voltage resulting from the closing movement of the valve needle due to an inductive effect in a magnetic circuit of the respective fuel injector during the closing movement.

9. The method as recited in claim 1, wherein the first calibration operating mode further includes determining a delay time of the first valve based on the monitoring of the first valve needle, and wherein the second calibration operating mode further includes determining a delay time of the first valve based on the monitoring of the second valve needle.

10. The system as recited in claim 6, wherein the specified target fuel quantity in each of the first and second calibration operating modes corresponds to the sum of the first and second fuel quantities in the standard operating mode.

11. The system as recited in claim 6, wherein the monitoring of the valve needle of the first fuel injector and the monitoring of the valve needle of the second fuel injector includes monitoring a voltage resulting from the closing movement of the valve needle due to an inductive effect in a magnetic circuit of the respective fuel injector during the closing movement.

12. The system as recited in claim 6, wherein the first calibration operating mode further includes determining a delay time of the first valve based on the monitoring of the first valve needle, and wherein the second calibration operating mode further includes determining a delay time of the first valve based on the monitoring of the second valve needle.

13. The non-transitory, computer-readable data storage medium as recited in claim 7, wherein the specified target fuel quantity in each of the first and second calibration operating modes corresponds to the sum of the first and second fuel quantities in the standard operating mode.

14. The non-transitory, computer-readable data storage medium as recited in claim 7, wherein the monitoring of the valve needle of the first fuel injector and the monitoring of the valve needle of the second fuel injector includes monitoring a voltage resulting from the closing movement of the valve needle due to an inductive effect in a magnetic circuit of the respective fuel injector during the closing movement.

15. The non-transitory, computer-readable data storage medium as recited in claim 7, wherein the first calibration operating mode further includes determining a delay time of the first valve based on the monitoring of the first valve needle, and wherein the second calibration operating mode further includes determining a delay time of the first valve based on the monitoring of the second valve needle.

\* \* \* \* \*